No. 632,236. Patented Sept. 5, 1899.
R. B. CHARLTON.
MACHINE FOR REMOVING SAW BURS FROM FISH PLATES.
(Application filed Apr. 12, 1899.)
(No Model.) 4 Sheets—Sheet 1.

WITNESSES: INVENTOR
Alfred R. Krausse. Richard B. Charlton,
Russell M. Everett. BY
Drake & Co.
ATTORNEYS.

No. 632,236. Patented Sept. 5, 1899.
R. B. CHARLTON.
MACHINE FOR REMOVING SAW BURS FROM FISH PLATES.
(Application filed Apr. 12, 1899.)
(No Model.) 4 Sheets—Sheet 2.

WITNESSES: Alfred R. Krousse. Russell M. Everett.

INVENTOR: Richard B. Charlton,
BY Drake & G.
ATTORNEYS.

No. 632,236. Patented Sept. 5, 1899.
R. B. CHARLTON.
MACHINE FOR REMOVING SAW BURS FROM FISH PLATES.
(Application filed Apr. 12, 1899.)
(No Model.) 4 Sheets—Sheet 3.

WITNESSES:
Alfred R. Krause.
Russell M. Everett.

INVENTOR:
Richard B. Charlton,
BY
Drake & Co.,
ATTORNEYS.

No. 632,236. Patented Sept. 5, 1899.
R. B. CHARLTON.
MACHINE FOR REMOVING SAW BURS FROM FISH PLATES.
(Application filed Apr. 12, 1899.)

(No Model.) 4 Sheets—Sheet 4.

WITNESSES: Alfred R. Krousse. Russell M. Everett.

INVENTOR:— Richard B. Charlton,
BY Drake & Co.
ATTORNEYS.

UNITED STATES PATENT OFFICE.

RICHARD B. CHARLTON, OF MILWAUKEE, WISCONSIN, ASSIGNOR TO THE CONTINUOUS RAIL JOINT COMPANY OF AMERICA, OF NEW JERSEY.

MACHINE FOR REMOVING SAW-BURS FROM FISH-PLATES.

SPECIFICATION forming part of Letters Patent No. 632,236, dated September 5, 1899.

Application filed April 12, 1899. Serial No. 712,734. (No model.)

*To all whom it may concern:*

Be it known that I, RICHARD B. CHARLTON, a citizen of the United States, residing at Milwaukee, in the county of Milwaukee and State of Wisconsin, have invented certain new and useful Improvements in Machines for Removing Saw-Burs from Fish-Plates; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The general object of this invention is to remove saw-burs from fish-plates and similar articles, and thus secure a neater and more marketable appearance in the article and enable a perfect contact to be made with the rail or other contacting part. Considerable delay and expense has heretofore been occasioned by chipping off the larger portion of this bur with a hammer and chisel, and more specific objects of my invention are to provide a machine for removing the bur, to thus secure a more finished product at less expense, and to secure other advantages and results, some of which may be hereinafter referred to in connection with the description of the working parts.

The invention consists in the improved machine for removing saw-burs from fish-plates and in the arrangements and combinations of parts thereof, all substantially as will be hereinafter set forth, and finally embraced in the clauses of the claim.

Figure 1:
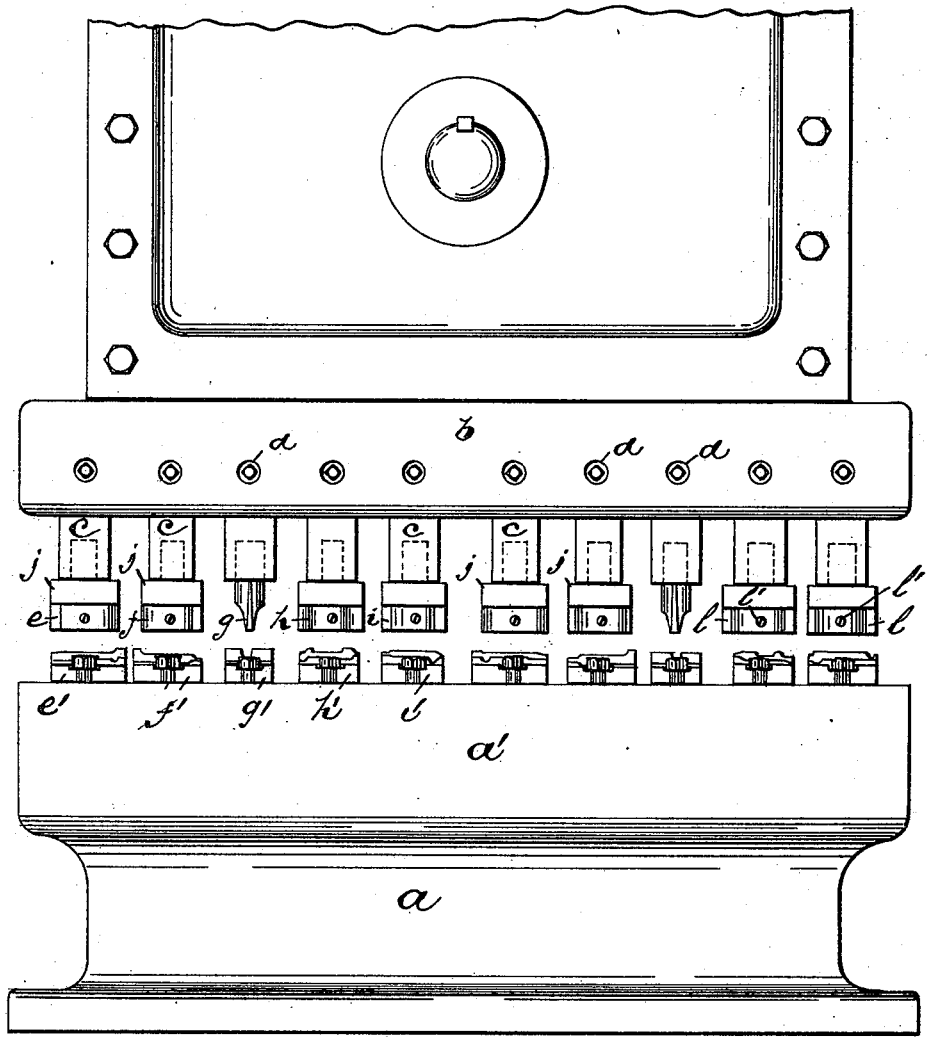
Figure 2:
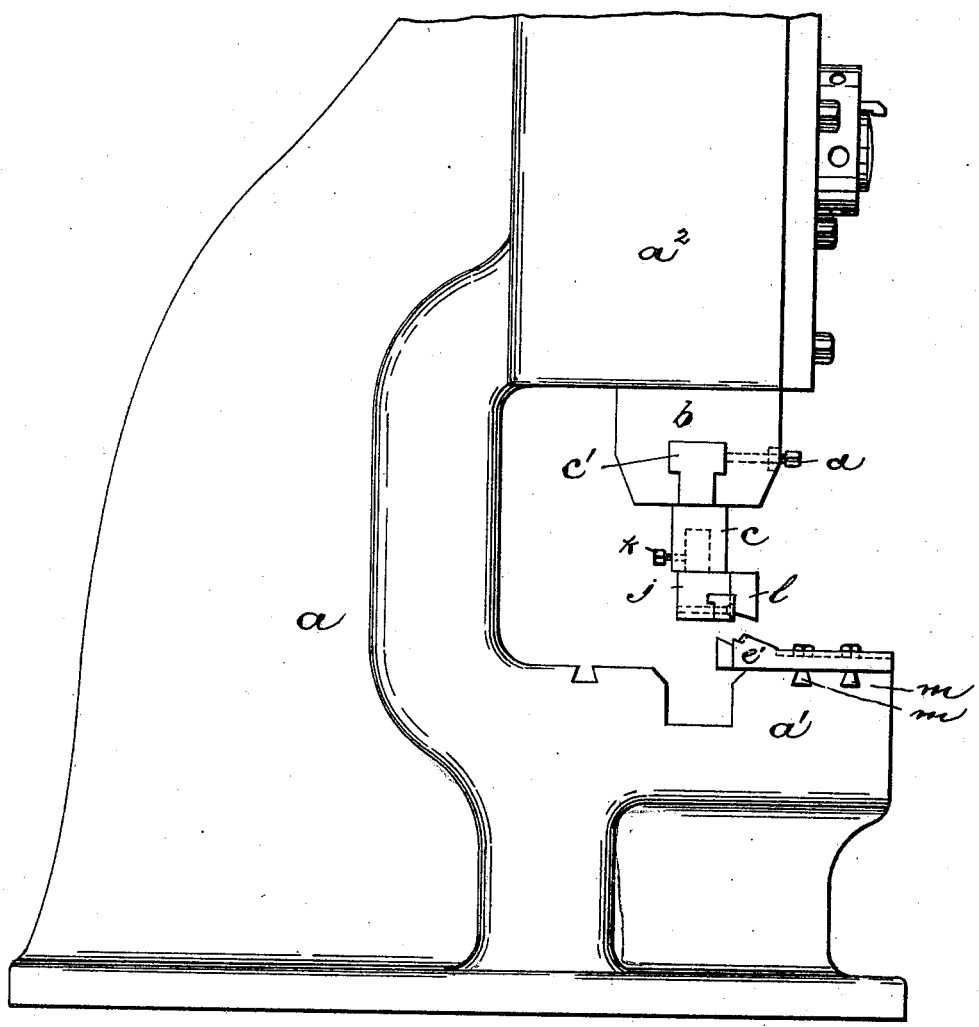
Figure 3:
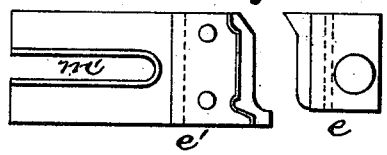
Figure 7:
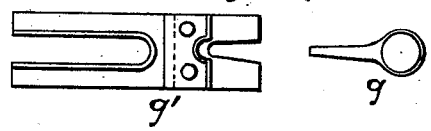
Figure 4:
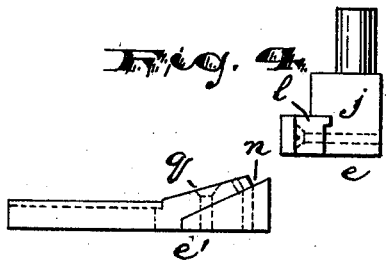
Figure 8:
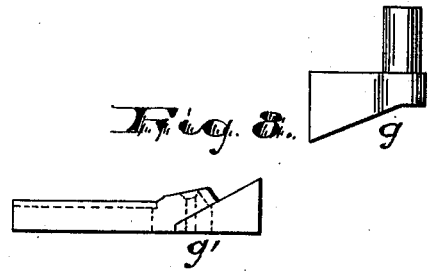
Figure 5:
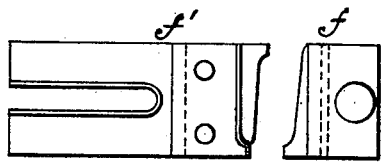
Figure 13:
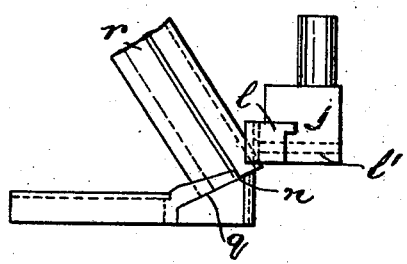
Figure 12:
Figure 14:
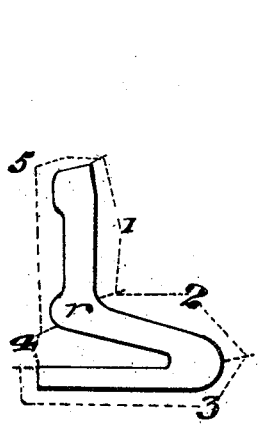
Figure 15:
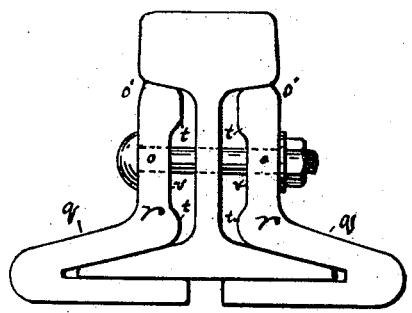

Referring to the accompanying drawings, in which like letters of reference indicate corresponding parts in each of the several views, Figure 1 is a front view of the machine. Fig. 2 is a side elevation of the same. Figs. 3, 5, 7, 9, and 11 are plan views of coöperating dies and cutters. Figs. 4, 6, 8, 10, and 12 are side elevations of the same. Fig. 13 is a side view showing the position assumed by a fish-plate in being operated upon by a cutter. Fig. 14 is an end view of the particular form of fish-plate to which for purposes of illustration I have shown my invention adapted, and Fig. 15 is a cross-section of a rail-joint in which such fish-plates have been used and showing the same in relation to the rail.

In said drawings, $a$ indicates the frame of the machine, made massive and heavy to secure the necessary solidity and constructed in any manner common to punches and presses, with the bed-plate $a'$ and upper part $a^2$ overhanging said bed-plate and providing a slideway for a vertically-movable ram $b$, adapted to be moved toward and away from the bed-plate $a'$. The lower end of the ram is recessed or slotted to receive the heads $c'$ of a series of T-headed carriers $c$, held against movement longitudinally of said slot or recess by set-screws $d$. The carriers $c$ carry punches $e, f, g, h,$ and $i$, each comprising a holder $j$, secured to the carrier by a set-screw $k$, and a cutting edge $l$, bolted to the holder by countersunk screws $l'$. The cutting edges $l$ are preferably of hardened steel and the holder $j$ of soft steel, as is common in the art of punching and shearing.

Beneath the punches $e, f, g, h,$ and $i$ are arranged dies $e', f', g', h',$ and $i'$, each die being so placed as to coöperate with its respective cutter and being secured to the bed $a'$ by taper-headed bolts $m$. The bolts $m$ extend through slots $m'$ in the dies, so that said dies can be adjusted to the punches or cutters when worn. The upper surfaces of the dies are inclined downwardly away from the cutting edges, as at $q$, and are recessed or cut away, as at $n$, adjacent to or back from said cutting edge. The said recess $n$ is of a width or depth back from the cutting edge substantially equal to or a trifle less than the thickness of the metal or article to be operated on. The fish-plate or other article having saw-burs at the ends is placed endwise against the die, the lower end of the fish-plate fitting in the recess $n$ and the upper end being inclined outwardly and held by the operator. With the fish-plate in this position the descending cutter engages the projecting corner edge of the plate and shears the saw-burs therefrom. The fish-plate is then reversed end for end and the operation repeated.

Figure 9:
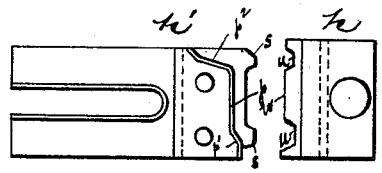
Figure 6:
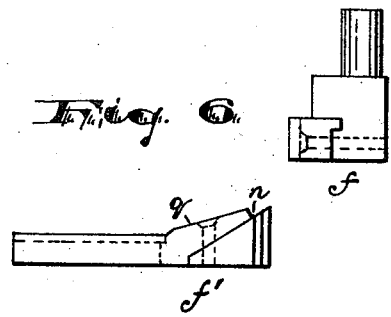
Figure 10:
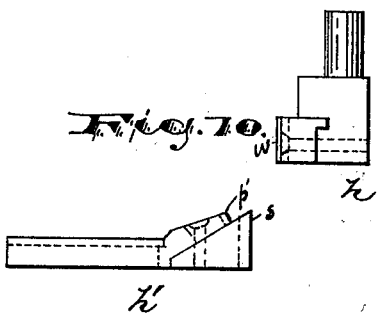
Figure 11:
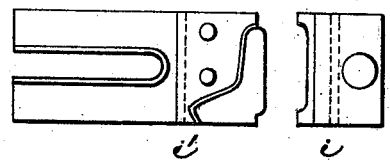

The particular die of the series to which I lay claim herein is shown in detail in Figs. 9 and 10 more particularly. In said figures the rear or inner wall of the recess $n$ is shown adapted to receive and support the vertical portion $o$ of the fish-plate when said fish-plate is placed endwise upon the lower die member $h'$, as before described. For this purpose the said rear wall of the recess has a straight middle part $p$, against which the normally outer side of the web of the fish-plate may lie. To prevent any twisting of the fish-plate with reference to the line of cutting of the dies, one end of said rear wall curves forwardly, as at $p'$, to receive and hold the outer upper rounded corner $o'$ of the vertical portion $o$ of the fish-plate, and the other end of said rear wall curves sharply backward, as at $p^2$, to receive that portion of the doubled part $q$ of the fish-plate which is adjacent to the vertical part $o$. At the front of the die are extensions $s, s$, arranged at or near the opposite ends of said front edge and being flush with the floor of the recess $n$. These extensions $s\ s$ serve to support the projections $t\ t$ on the normally inner side of the fish-plate and prevent any forward tilting of the fish-plate as it is acted on by the dies. The upper cutting member $h$, adapted to coöperate with the die $h'$, has at its cutting face or edge a middle straight portion $w$, which operates on the flat normally inner side $v$ of the fish-plates, and at each side of said straight portion is a recess $u$ in the face of the cutter, which receives the projections $t$ on the fish-plate and extensions $s$ on the lower die member. By means of the two coöperating dies thus described the saw-bur may be quickly and entirely removed from the inner face of the vertical portion or web of the fish-plate and a perfect fit secured without the expenditure of a large amount of hand labor, as will be understood.

Having thus described the invention, what I claim as new is—

1. In a machine for removing saw-burs from fish-plates, the combination of a lower die member providing a support for the vertical portion or web $o$, of the fish-plate when in endwise position, said lower die member having at its front edge, which coöperates with the upper die member, end extensions $s, s$, adapted to support the projections $t, t$, on the normally inner side of the vertical portion of the fish-plate, and said upper die member, having a straight middle portion $w$, of its cutting edge adapted to extend between said projections $s, s$, on the lower die member and at each side of said straight middle portion having recesses $u, u$, to receive the projections $s, s$, substantially as set forth.

2. In a machine for removing saw-burs from fish-plates, the combination of a die recessed adjacent to its cutting edge to receive in an endwise position the vertical portion $o$, of the fish-plate, the inner wall of said recess being straight for its middle portion $p$, and adapted to support the straight normally outer side of the vertical portion of the fish-plate, and the opposite ends of said inner wall of the recess being one forwardly curved, as at $p'$, to hold the head $o'$, of the fish-plate and the other curved sharply backward as at $p^2$, to receive that portion $q$, of the doubled part of the fish-plate adjacent to the vertical web, and a vertically-moving cutting-die coöperating with said recessed die and having its cutting edge formed with end recesses $u, u$, adapted to receive the projections $s, s$, on the fish-plate as it is held in said recessed die, substantially as set forth.

3. The combination in a machine for removing saw-burs from fish-plates, of a lower die, $h'$, having a recessed seat for the fish-plate providing at its inner wall a straight middle part $p$, and oppositely-curved ends $p', p^2$, whereby the vertical portion $o$, of the fish-plate is firmly held with the normally inner side presented, forward extensions $s$, at the front edge of said lower die and supporting the projections $t, t$, on said normally inner side of the fish-plate, and a vertically-moving upper die member $h$, coöperating with said lower member, and having in its cutting-face end recesses $u, u$, adapted to receive the extensions $s, s$, and having a straight middle part $w$, substantially as set forth.

In testimony that I claim the foregoing I have hereunto set my hand this 3d day of April, 1899.

RICHARD B. CHARLTON.

Witnesses:
H. W. HASKELL,
P. H. ESTES.